US011992720B2

(12) United States Patent
Lines

(10) Patent No.: US 11,992,720 B2
(45) Date of Patent: May 28, 2024

(54) CARTRIDGE STATUS INDICATOR

(71) Applicant: Carrier Corporation, Palm Beach Gardens, FL (US)

(72) Inventor: Michael Lines, South Windsor, CT (US)

( * ) Notice: Subject to any disclaimer, the term of this patent is extended or adjusted under 35 U.S.C. 154(b) by 293 days.

(21) Appl. No.: 17/248,017

(22) Filed: Jan. 5, 2021

(65) Prior Publication Data

US 2021/0220683 A1 Jul. 22, 2021

Related U.S. Application Data

(60) Provisional application No. 62/963,603, filed on Jan. 21, 2020.

(51) Int. Cl.

| | |
|---|---|
| ***A62C 35/13*** | (2006.01) |
| ***A62C 35/02*** | (2006.01) |
| ***A62C 37/10*** | (2006.01) |
| ***A62C 37/50*** | (2006.01) |
| *A62C 3/00* | (2006.01) |

(52) U.S. Cl.

CPC ............ *A62C 35/13* (2013.01); *A62C 35/023* (2013.01); *A62C 37/10* (2013.01); *A62C 3/006* (2013.01)

(58) Field of Classification Search

CPC ....... A62C 3/006; A62C 37/10; A62C 35/023; A62C 35/13

See application file for complete search history.

(56) References Cited

U.S. PATENT DOCUMENTS

| | | | | |
|---|---|---|---|---|
| 4,373,588 A | | 2/1983 | White et al. | |
| 4,527,635 A | * | 7/1985 | Kirchner ................ | A62C 35/02 169/42 |
| 6,189,624 B1 | | 2/2001 | James | |
| 9,339,671 B1 | * | 5/2016 | Raj ........................ | A62C 13/78 |
| 9,539,453 B2 | * | 1/2017 | Krueger ................. | A62C 35/13 |
| 9,827,456 B2 | * | 11/2017 | McManama ........... | A62C 37/50 |
| 10,282,967 B2 | | 5/2019 | Law | |

(Continued)

FOREIGN PATENT DOCUMENTS

| | | |
|---|---|---|
| CA | 2361324 | 8/2005 |
| GB | 2084014 A | 4/1982 |

(Continued)

OTHER PUBLICATIONS

EP Application No. 21150985.6, Search Report, dated May 28, 2021, 10 pages.

*Primary Examiner* — Joseph A Greenlund

(57) ABSTRACT

A cartridge with a status indicator, a fire suppression system for incorporating the same, and a method of inspecting whether a fire suppression system is capable of being actuated are provided. The status indicator is connected to the body of the cartridge. The status indicator defines a first state and a second state. The status indicator undergoes a change from the first state to the second state when exposed to a physical change. The physical change may include at least one of a decrease in temperature beyond a threshold, an increase in relative humidity beyond a threshold, and a threshold differential temperature change. The physical change is caused by the discharge of the cartridge. When installed within a fire suppression system, the status indicator enables the visual inspection of whether the fire suppression system is capable of being actuated.

13 Claims, 5 Drawing Sheets

(56) References Cited

U.S. PATENT DOCUMENTS

| | | | | |
|---|---|---|---|---|
| 10,814,152 | B1 * | 10/2020 | Aryee | A62C 37/48 |
| 2008/0185159 | A1 * | 8/2008 | Walsh | A62C 35/60 169/14 |
| 2009/0301739 | A1 * | 12/2009 | Rother | A62C 13/76 340/626 |
| 2010/0132967 | A1 * | 6/2010 | Yoshida | A62C 13/76 169/62 |
| 2010/0236796 | A1 * | 9/2010 | Chattaway | A62C 37/44 169/46 |
| 2013/0340885 | A1 * | 12/2013 | Clayton | B65D 25/56 428/29 |
| 2015/0345653 | A1 * | 12/2015 | Miller | F16K 1/32 137/59 |
| 2017/0169738 | A1 | 6/2017 | David et al. | |
| 2017/0253486 | A1 * | 9/2017 | Hersam | C01B 25/003 |
| 2018/0169450 | A1 * | 6/2018 | Moffa | G08B 29/145 |
| 2018/0169451 | A1 * | 6/2018 | Moffa | A62C 37/50 |
| 2018/0189621 | A1 * | 7/2018 | Tokuda | G06Q 10/087 |
| 2019/0168037 | A1 * | 6/2019 | Lian | A62C 37/04 |
| 2019/0209880 | A1 * | 7/2019 | Deyoung | A62C 37/11 |
| 2019/0374803 | A1 * | 12/2019 | Ryczek | A62C 35/023 |
| 2021/0046344 | A1 * | 2/2021 | Kaiser | A62C 99/0018 |
| 2021/0220683 | A1 * | 7/2021 | Lines | A62C 35/13 |
| 2021/0220685 | A1 * | 7/2021 | Penden | A62C 37/44 |
| 2022/0212046 | A1 * | 7/2022 | Pena | A62C 37/40 |

FOREIGN PATENT DOCUMENTS

| | | | |
|---|---|---|---|
| IN | 201717006925 | | 7/2017 |
| WO | 2018112385 | A2 | 6/2018 |

* cited by examiner

CARTRIDGE STATUS INDICATOR

CROSS REFERENCE TO A RELATED APPLICATION

The application claims the benefit of U.S. Provisional Application No. 62/963,603 filed Jan. 21, 2020, the contents of which are hereby incorporated in their entirety.

BACKGROUND

Fire suppression systems for commercial cooking applications are often actuated by disposable cartridges that are filled with compressed gases, such as, for example, nitrogen or carbon dioxide. These disposable cartridges are used to pressurize the actuation line and open the valve(s) to allow the fire suppression agent to discharge. Without a fully pressurized disposable cartridge, the fire suppression system cannot discharge the fire suppression agent.

To ensure that the fire suppression system is ready to discharge the fire suppression agent in the event of a fire, standards bodies such as the National Fire Protection Association (NFPA) require testing and inspection of the fire suppression system semi-annually for commercial kitchens. To be prepared for the next test or potential fire, the disposable cartridges in the system need to be replaced following each discharge, as the disposable cartridges can only be used for one actuation. A current limitation of many fire suppression systems is the inability to visually inspect whether the disposable cartridge within the fire suppression system is fully pressurized and able to actuate the fire suppression system.

Accordingly, there remains a need for an indicator that enables one to visually inspect whether the disposable cartridge within the fire suppression system is fully pressurized or has been discharged and needs to be replaced.

BRIEF DESCRIPTION

According to one embodiment, a cartridge for a pressurized gas triggering device is provided. The cartridge includes a body and a status indicator. The body may be used for holding a pressurized gas, the body defining a breakable seal for releasing the pressurized gas when broken. The status indicator may be connected to the body, the status indicator including a first state and a second state, wherein the status indicator undergoes a change from the first state to the second state when exposed to a change in a physical parameter of the body.

In accordance with additional or alternative embodiments, the status indicator is connected to the cartridge with an adhesive.

In accordance with additional or alternative embodiments, the change in a physical parameter of the body includes at least one of a decrease in temperature beyond a threshold temperature value, an increase in relative humidity beyond a threshold relative humidity value, an increase in absolute humidity beyond a threshold absolute humidity value, and a decrease in an instant differential temperature rate beyond a threshold differential temperature rate.

In accordance with additional or alternative embodiments, the status indicator includes at least one thermo-sensitive ink and wherein the change from the first state to the second state by the status indictor is defined by at least a portion of the at least one thermo-sensitive ink changing from a first color to a second color.

In accordance with additional or alternative embodiments, the status indicator includes a temperature sensor disposed in thermal communication with the body and in electrical communication with a visual indicator and wherein the change in a physical parameter of the body comprises a rate of temperature change of the body.

In accordance with additional or alternative embodiments, the rate of temperature change of the body is calculated using at least one processor, the at least one processor being in electrical communication with the status indicator.

In accordance with additional or alternative embodiments, the change from the first state to the second state is irreversible.

According to another aspect of the disclosure a fire suppression system is provided. The fire suppression system includes a cylinder and a cartridge. The cylinder may be used for holding a fire suppression agent, the cylinder including a valve for controlling the release of the fire suppression agent. The cartridge may be operatively connected to the valve. The cartridge includes a body and a status indicator. The body for may be used for holding a pressurized gas, the body including a breakable seal for releasing the pressurized gas when broken. The status indicator may be connected to the body, the status indicator including a first state and a second state, wherein the status indicator undergoes a change from the first state to the second state as a result of the pressurized gas in the cartridge being discharged.

In accordance with additional or alternative embodiments, the discharge of the pressurized gas in the cartridge causes a physical change, the status indicator changing from the first state to the second state when exposed to the physical change.

In accordance with additional or alternative embodiments, the pressurized gas is discharged using a piercing pin.

In accordance with additional or alternative embodiments, the cartridge is configured within a control box, the control box comprising a window configured to allow the status indicator to be visually inspected.

In accordance with additional or alternative embodiments, the status indicator is communicatively connected with a visual indicator, the visual indicator signaling when the status indicator changes from the first state to the second state.

In accordance with additional or alternative embodiments, the visual indicator is located on a control box.

In accordance with additional or alternative embodiments, the connection between the status indicator and the visual indicator is wireless.

In accordance with additional or alternative embodiments, the connection between the status indicator and the visual indicator is wired.

According to another aspect of the disclosure a method of inspecting whether a fire suppression system is capable of being actuated is provided. The method includes determining whether a cartridge within a control box of a fire suppression system contains enough of a pressurized gas to actuate the fire suppression system by inspecting whether a status indicator connected to a body of the cartridge is in a first state or a second state.

In accordance with additional or alternative embodiments, when the pressurized gas is discharged from the cartridge a physical parameter of the body changes causing the status indicator to change from the first state to the second state.

In accordance with additional or alternative embodiments, the method further includes removing the cartridge if the status indicator is in the second state.

In accordance with additional or alternative embodiments, the change in a physical parameter of the body includes at least one of a decrease in temperature beyond a threshold temperature value, an increase in relative humidity beyond a threshold relative humidity value, an increase in absolute humidity beyond a threshold absolute humidity value, and a decrease in an instant differential temperature rate beyond a threshold differential temperature rate.

In accordance with additional or alternative embodiments, the change from the first state to the second state is irreversible.

In accordance with additional or alternative embodiments, the status indicator is communicatively connected with a visual indicator, the visual indicator signaling when the status indicator changes from the first state to the second state.

In accordance with additional or alternative embodiments, the cartridge is located in a control box and the visual indicator is located on a control box.

BRIEF DESCRIPTION OF THE DRAWINGS

The subject matter, which is regarded as the disclosure, is particularly pointed out and distinctly claimed in the claims at the conclusion of the specification. The following descriptions of the drawings should not be considered limiting in any way. With reference to the accompanying drawings, like elements are numbered alike:

DETAILED DESCRIPTION

Figure 1:
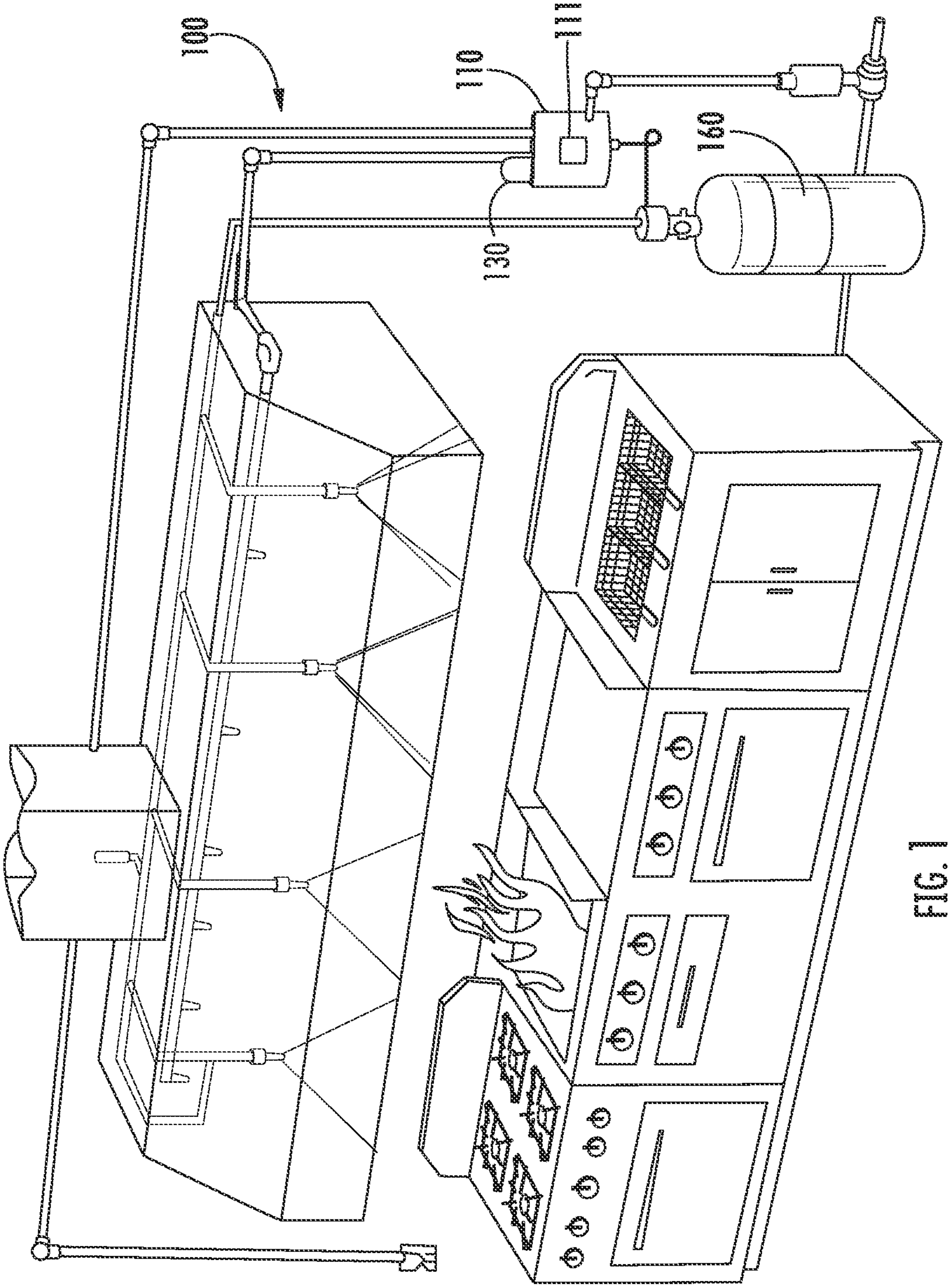
FIG. 1 is a schematic illustration of a fire suppression system in accordance with one aspect of the disclosure.

Visually inspecting whether a disposable cartridge has been discharged and is in need of replacement can be difficult. For example, it may be difficult to know whether a disposable cartridge within a pressurized gas triggering device has been discharged and is in need of replacement without removing the cartridge from an operational position (e.g., to inspect a breakable seal on the cartridge indicating usage). To enable a visual inspection as to whether a disposable cartridge, for example, within a pressurized gas triggering device, has been discharged without removing the disposable cartridge from an operational position, a cartridge with a status indicator is provided. It is envisioned that the cartridge with a status indicator may be used for any pressurized gas triggering device. A pressurized gas triggering device may include any device which uses a disposable cartridge. An example of a pressurized gas triggering device can include the actuation mechanism of a fire suppression system. Although the cartridge with a status indicator is capable of being used within any pressurized gas triggering device, for purposes of clarity and brevity, the cartridge with a status indicator has only been depicted within a fire suppression system.

Fire suppression systems can be actuated by discharging a disposable cartridge. The fire suppression system may, in certain instances, use the disposable cartridge to force open the valve(s) of the cylinder(s) holding the fire suppression agent so that the fire suppression agent can be discharged through the piping system and out of the nozzles to extinguish a detected fire risk. To ensure that the disposable cartridge is ready and able to actuate the fire suppression system the disposable cartridge should be replaced following each actuation. To help ensure the cartridge is replaced, a cartridge with a status indicator is provided. The status indicator can help to ensure that the disposable cartridge is replaced by providing a visual indication that the fire suppression system has been previously actuated and the disposable cartridge was not replaced following the actuation.

As explained previously, to actuate a fire suppression system the disposable cartridge can be discharged to release fire suppression agent. The disposable cartridge within the system can, in certain instances, be either manually, via a pull station, mechanically, via fusible links and cables, or electrically, via a control panel, discharged. To discharge the disposable cartridge a breakable seal of the cartridge can be punctured or otherwise mechanically broken to release pressurized gas (e.g., carbon dioxide). In some exemplary systems a piercing pin may be used to puncture the seal of the cartridge and release the pressurized gas. In a further example of an exemplary system, the piercing pin may, in certain instances, be engaged by the rotation of a cam. The pressurized gas, once released from within the cartridge, can be used to pressurize a mechanism which opens the valve(s) to discharge the fire suppression agent.

The fire suppression system is designed to be reset following each discharge event. The resetting of the fire suppression system may contain multiple steps, including, but not limited to: replacing or refilling the cylinder(s) holding the fire suppression agent; purging and/or cleaning the suppression piping circuit(s) (e.g., including the discharge nozzles), resetting the mechanism that opens the valve(s); resetting the piercing pin in a ready-to-engage position, which may include rotating a cam, moving (e.g., sliding or rotating) the piercing pin against a spring force which is released by a discharging device (e.g., fusible link, pull station, and the like); and replacing the disposable cartridge with a full cartridge, which contains enough pressurized gas to pressurize the mechanism which opens the valve(s) to discharge the fire suppression agent.

For the fire suppression agent to be able to discharge, the disposable cartridge needs to contain enough pressurized gas to cause the valve(s) to open. As such, one of the most critical aspects of resetting of the fire suppression system can be the replacement of the disposable cartridge. Without replacing the disposable cartridge, the fire suppression agent cannot be discharged. This is because a discharged cartridge will not have enough pressurized gas to pressurize the mechanism which opens the valve(s) of the cylinders holding the fire suppression agent. Although the status indicator is described in terms of being used with disposable cartridges, the status indicator may, in certain instances, be used with refillable cartridges. When used with refillable cartridges, in certain instances, the status indicator may need to be either replaced or reset when the refillable cartridge is replaced or refiled. In conjunction with what is described below, the status indicator, in certain instances, can help to ensure replacement of the disposable cartridge following each discharge by providing a visual indication that actuation has occurred without requiring the removal of the cartridge for inspection.

Fire suppression systems for many types of applications especially industrial and commercial applications, use disposable pressurized gas cartridges. With reference now to the Figures, an exemplary fire suppression system 100 used in a commercial cooking application is schematically shown in FIG. 1, which incorporates a cartridge 140 with a status indicator 120, shown in FIGS. 3 and 4, within the control box 110. The control box 110, in certain instances, includes a window 111 to allow the status indicator 120 to be visually inspected within the control box 110. In certain instances, the control box 110 may be able to be opened using a door (not shown) to allow the status indicator 120 to be visually inspected within the control box 110. In certain instances, the current state of the status indicator 120 can be displayed outside the control box 110. For example, the status of the disposable cartridge can be displayed on a visual indicator 130 (e.g., light emitting diode LED indicator, as shown in FIG. 3) disposed on the control box 110, on control panel (e.g., fire panel, security panel, and the like), on a software program (e.g., building monitoring software, mobile phone application), and the like.

Figure 2:
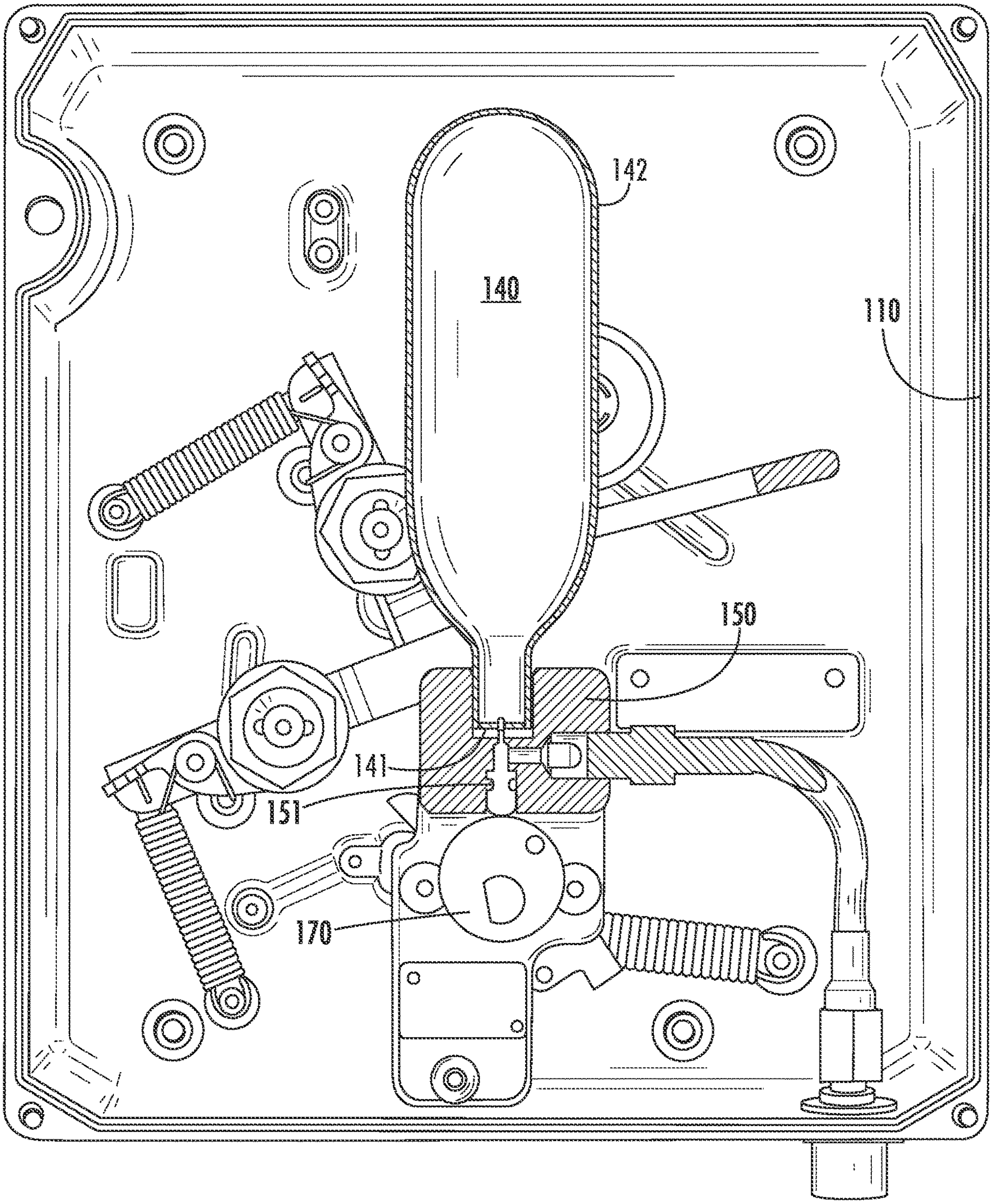
FIG. 2 is a cross-sectional view of a cartridge installed within a fire suppression system in accordance with one aspect of the disclosure.

As shown in FIG. 2, within the control box 110 the exemplary fire suppression system 100 includes a cartridge 140 with a status indicator 120 (shown in FIGS. 3 and 4) for holding a pressurized gas, the cartridge 140 operatively connected to a valve 150. The fire suppression system 100 also includes a cam 170 for engaging a piercing pin 151, the piercing pin 151 configured to release the pressurized gas from within the cartridge 140 by piercing the breakable seal 141 of the cartridge 140. The cam 170, when rotating, may cause the piercing pin 151 move toward the seal 141 of the cartridge 140. In certain instances, the piercing pin 151 moves toward the seal 141 of the cartridge 140 due to the shape of the cam 170, for example, an oval shape of the cam 170 may push the piercing pin 151 as the cam 170 rotates. In certain instances, the piercing pin 151 moves toward the seal 141 of the cartridge 140 due to a connecting member (not shown) connected to the piercing pin 151 and the cam 170. For example, the connecting member may cause the piercing pin 151 to move toward the seal 141 of the cartridge 140 as the cam 170 rotates. The connecting member may, in certain instances, be a spring, cantilever, or any suitable mechanism to cause the piercing pin 151 to move toward the cartridge 140.

Figure 3:
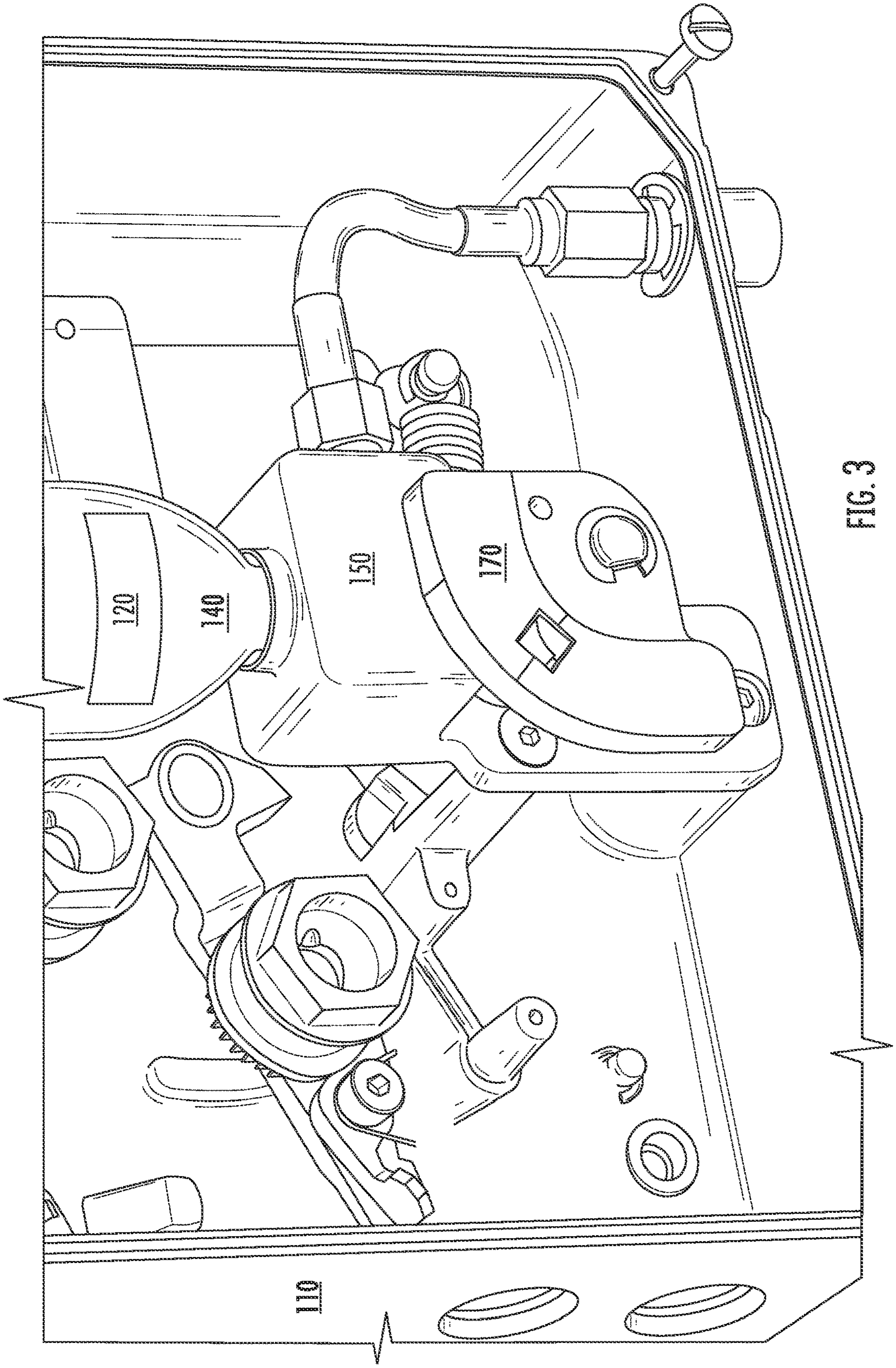
FIG. 3 is a perspective view of a cartridge with an exemplary embodiment of a status indicator in a first state in accordance with one aspect of the disclosure.
Figure 4:
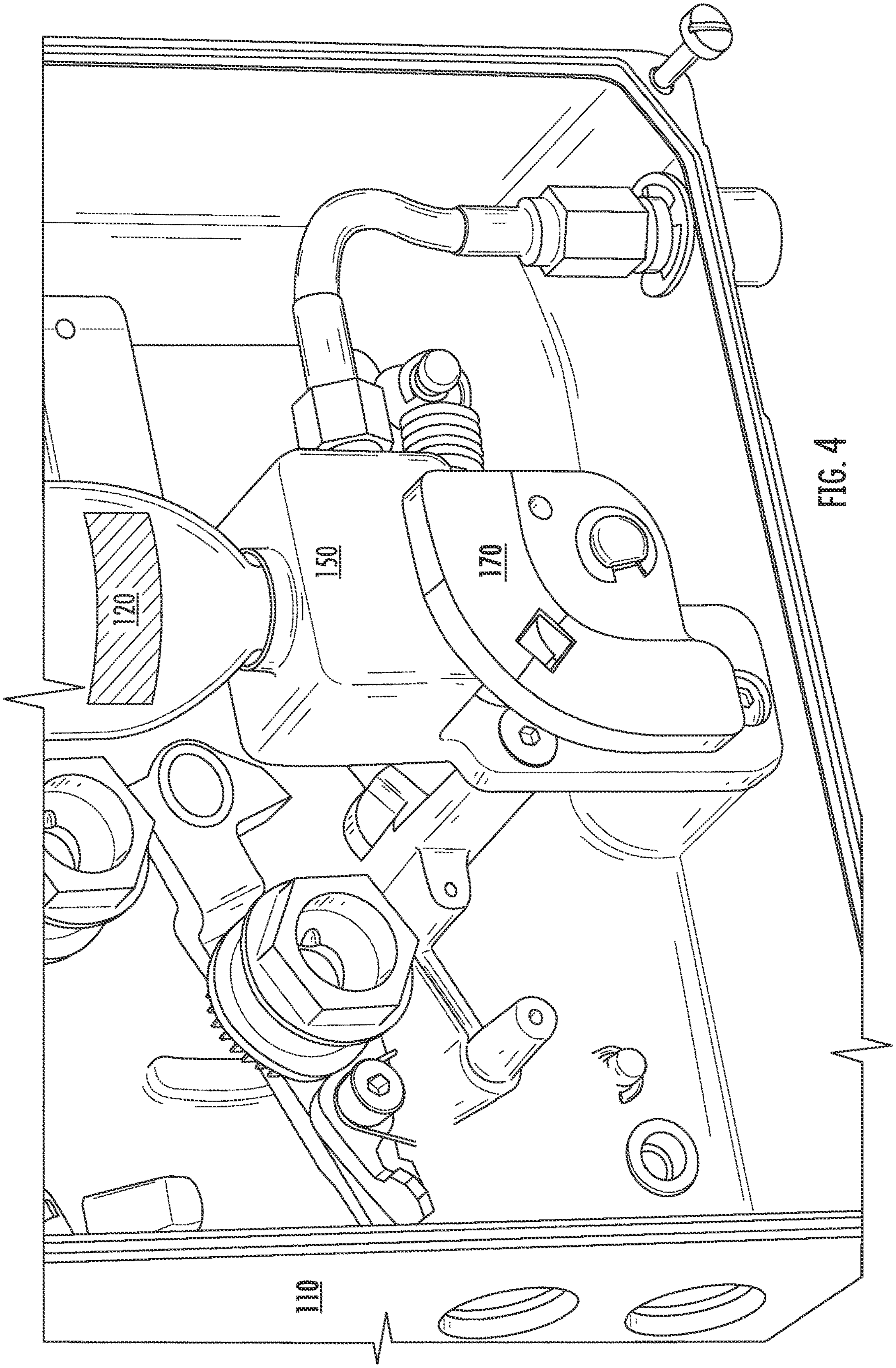
FIG. 4 is a perspective view of a cartridge with an exemplary embodiment of a status indicator in a second state in accordance with one aspect of the disclosure.

The status indicator 120, as shown in FIGS. 3 and 4, is connected to the body 142 of the cartridge 140. The body 142, shown in FIG. 2, of the cartridge 140 is configured to hold the pressurized gas. The body 142 includes a breakable seal 141 for releasing the pressurized gas. The status indicator 120 defines a first state (ex. shown in FIG. 3) and a second state (ex. shown in FIG. 4). The status indicator 120 undergoes a change from the first state to the second state as a result of the pressurized gas in the cartridge 140 being discharged. The change from the first state to the second state by the status indicator 120, is due to a physical change that occurs when the cartridge 140 is discharged.

As the pressurized gas is discharged from the cartridge 140, the pressure of the gas rapidly decreases which can result in a rapid decrease in temperature (e.g., by the Joule-Thomson effect). This rapid decrease in temperature is reflected on the surface of the body 142 of the cartridge 140. Based on the local environmental conditions, the rapid decrease in the surface temperature of the body 142 can cause condensation or ice to form on the surface of the body 142 of the cartridge 140 (e.g., in a humid kitchen). The status indicator 120, by being connected to the body 142 of the cartridge 140, is capable of sensing these physical changes (e.g. sensing decreases in temperature, increases in relative humidity caused by condensation formation, and/or differential temperature changes). When sensing a physical change, the status indicator 120 changes from a first state to a second state (e.g. when sensing a decrease in temperature beyond a threshold, an increase in relative humidity beyond a threshold, and/or a threshold differential temperature change). A status indicator 120 in a second state can provide visual indication that discharge of the cartridge 140 has occurred. Because status indicator 120 can provide a clear visual indication of the present state (e.g., full or discharge) of the cartridge 140, people (e.g., kitchen staff or service technicians) can be alerted to an empty cartridge 140 without the need for opening the control box 110.

In certain instances, the status indicator 120 is connected to the cartridge 140 with an adhesive. For example, the status indicator 120 may have adhesive on a back side to allow the status indicator 120 to be placed on the cartridge 140 either before or after installation within the fire suppression system 100. When adhered to the cartridge 140, in certain instances, the status indicator 120 is replaced when the cartridge 140 is replaced. In certain instances, the status indicator 120 is connected to the cartridge 140 using a different connecting mechanism, for example, using transfer paper, a mechanical fastener, and the like (not shown).

As shown in FIGS. 3 and 4, the status indicator 120 undergoes a change from the first state to the second state when exposed to a physical change. An exemplary depiction of a status indicator 120 shown in the first state is shown in FIG. 3. An exemplary depiction of a status indicator 120 shown in the second state is shown in FIG. 4. As described above, in certain instances, the physical change includes at least one of a decrease in temperature beyond a threshold, an increase in relative humidity beyond a threshold, and a threshold differential temperature (e.g., change in temperature as a function of time) caused by the discharge of the cartridge 140.

When detecting a decrease in temperature beyond a threshold, in certain instances, the status indicator 120 can include at least one thermo-sensitive ink (e.g., containing leuco dye, liquid crystals, and/or other suitable thermo sensitive ink), which can change color in response to being exposed to a certain temperature. The change from the first state to the second state by the status indicator 120, in certain instances, can be defined by at least a portion of the at least one thermo-sensitive ink changing to a color (e.g. changing from clear to red). For example, the status indicator 120 may be determined to be in the second state when at least a portion of the status indicator 120 changes color, which may occur when the status indicator 120 is exposed to a threshold temperature. In certain instances, the change from the first state to the second state is irreversible. The threshold value for decrease in temperature may be any temperature capable of indicating that the cartridge 140 has been discharged. This threshold temperature may, in certain instances, be between −20° C. and 10° C. For example, the threshold temperature may be between −20° C. and 5° C., between −20° C. and 0° C., between −20° C. and −5° C., between −20° C. and −10° C., between −20° C. and −15° C., or between −15° C. and 10° C., between −15° C. and 5° C., between −15° C. and 0° C., between −15° C. and −5° C., between −15° C. and −10° C., between −10° C. and 10° C., between −10° C. and 5° C., between −10° C. and 0° C., between −10° C. and −5° C., or between −5° C. and 10° C., between −5° C. and 5° C., or between −5° C. and 0° C. For example, in certain instances, if the threshold temperature is −5° C. the status indicator 120 may be in a first state when the status indicator 120 is exposed to temperatures above −5° C., and change to a second state when exposed to temperatures at or below −5° C.

When detecting an increase in relative humidity and/or absolute humidity, in certain instances, the status indicator 120 can include at least one dissolvable crystal, which can dissolve when exposed to a certain relative humidity (RH) or a capacitance sensor which can detect the formation of water and/or ice on the outside surface of the body 142. The change from the first state to the second state by the status indicator 120, in certain instances, is defined by at least a portion of the dissolvable crystal dissolving and changing to a color (e.g. changing from a clear to a blue or green). For example, the status indicator 120 may be determined to be in the second state when at least a portion of the status indicator changes color, which may occur when the status indicator 120 is exposed to a threshold relative humidity. In certain instances, the change from the first state to the second state is irreversible. The threshold relative humidity may be any relative humidity capable of indicating that the cartridge 140 has been discharged. This threshold relative humidity may, in certain instances, be between 50% RH and 90% RH. For example, the threshold relative humidity may be between 50% RH and 80% RH, between 50% RH and 70% RH, between 50% RH and 60% RH, between 60% RH and 90% RH, between 60% RH and 80% RH, between 60% RH and 70% RH, between 70% RH and 90% RH, between 70% RH and 80% RH, or between 80% RH and 90% RH.

When detecting a threshold differential temperature, in certain instances, the status indicator 120 can include a temperature sensor (not shown, e.g., a thermocouple, thermistor, resistance temperature detector (RTD), and the like). The temperature sensor can be operatively coupled to one or more processor(s) (not shown) and/or electrical circuit(s) capable of measuring and/or calculating an instant differential temperature rate and comparing the instant rate to a threshold differential temperature rate. The threshold differential temperature rate, in certain instances, is measured in terms of change in temperature ($\Delta T$) divided by change in time ($\Delta t$). Any suitable time range and temperature difference can be used. Any suitable time averaging calculation can be employed to aid in reducing fluctuation of the rate of temperature change calculation, for example, a differential temperature rate can calculation can include a moving average (e.g., 3-point, 5-point, 10-point moving averages and the like). Care should be taken in choosing a time averaging method as the rate of temperature change of the body can be very fast (e.g., on the order of seconds). Data sampling frequency and averaging calculations should therefore be limited to similar time scales to avoid a false indication that the cartridge is full. For example, the threshold differential temperature may, in certain instances, be a ratio of a change in temperature (e.g. decrease by 5° C.) over a given timeframe (e.g. two seconds). The change in temperature, in certain instances, is a decrease by at least 5° C., a decrease by at least 10° C., a decrease by at least 20° C., or a decrease by at least 40° C. The timeframe, in certain instances, is between 1 second and 30 seconds. For example, the timeframe may be between 1 second and 20 seconds, between 1 second and 15 seconds, between 1 second and 10 seconds, between 1 second and 5 seconds, between 1 second and 2 seconds, between 2 seconds and 20 seconds, between 2 seconds and 15 seconds, between 2 second and 10 seconds, between 2 second and 5 seconds, between 5 seconds and 20 seconds, between 5 seconds and 15 seconds, between 5 seconds and 10 seconds, between 10 seconds and 20 seconds, between 10 seconds and 15 seconds, or between 15 seconds and 20 seconds. The threshold differential temperature rate can be any value that captures an expected rapid decrease in surface temperature when the cartridge 140 releases pressurized gas including a rate of between about −15° C./sec to about −0.5° C./sec. For example, the threshold differential temperature rate can be about −1° C./sec to about −10° C./sec, or from about −1° C./sec to about −5° C./sec, or from about −2° C./sec to about −4° C./sec, or from about −4° C./sec to about −6° C./sec, or from about −6° C./sec to about −8° C./sec, or from about −8° C./sec to about −10° C./sec, or from about −10° C./sec to about −12° C./sec, or from about −12° C./sec to about −15° C./sec, or the like.

The status indicator 120 can indicate, by being in a second state, that the cartridge 140 is empty (e.g., has not been replaced following actuation). The status indicator 120, in certain instances, is viewable through the window 111 in the control box 110, or through opening a door (not shown) in the control box 100. An individual, by observing the status indicator 120 in a second state, may be alerted that the fire suppression system 100 was actuated and the cartridge 140 has not yet been replaced. Thus, in certain instances, the status indicator 120 provides a visual indication as to whether the cartridge 140 needs to be replaced in order to know whether the fire suppression system 100 to be capable of being actuated.

As shown in FIG. 1, in certain instances, fire suppression system includes a visual indicator 130. The status indicator 120, in certain instances, is communicatively connected with the visual indicator 130 (e.g., via wire conductors, via wireless signal, and the like). For example, the status indicator 120 may include at least one communication module (not shown) capable of sending a signal to the visual indicator 130 when the status indicator 120 is in the second state. When incorporating a visual indicator 130, the visual indicator may be used to signal when the status indicator changes from the first state to the second state. For example, the visual indicator 130 may flash a light, flash a message (e.g., on a display screen of a central station or control panel), annunciate an alarm (e.g., locally at the control box 110, on a wirelessly connected mobile phone, or at a central station), or the like when the status indicator 120 is in the second state (e.g. when receiving a signal from the status indicator 120 that it is in the second state). In certain instances, the connection between the status indicator 120 and the visual indicator 130 is wireless. For example, the status indicator 120 may communicate (e.g. using a wireless communication module) with the visual indicator 130 using Wi-Fi, Bluetooth, Zigbee, infrared, cellular or any other short-range or long-range wireless communication method known to one skilled in the art. In certain instances, the connection between the status indicator 120 and the visual indicator 130 is wired (e.g. using a wired connection between a communication module and the visual indicator 130).

It is envisioned that the design and configuration of the status indicator 120 can help to ensure that the cartridge 140 is replaced following actuation. Regardless of whether the status indicator 120 is designed to be replaced after each use (e.g. installing a new cartridge 140 with a new status indicator 120) or is designed for multiple uses (e.g. placing the same status indicator 120 on the new or refilled cartridge 140), in certain instances the status indicator 120 may be designed as an indication mechanism for displaying whether a cartridge 140 has been discharged. In certain instances, the status indicator 120 is produced as a label with an adhesive side capable of adhering to the body 142 of the cartridge 140. In certain instances, the status indicator 120 is designed to be reusable, for example, by allowing for the status indicator to be reset and reconnected to a new or refilled cartridge 140 (e.g. using Velcro, or other connection mechanism).

The status indicator 120 is designed and configured to help ensure that the cartridge 140 is replaced after actuation, so that the cartridge 140 is capable of providing enough pressurized gas to pressurize the actuation line and cause valves(s) of the cylinder(s) holding the fire suppression agent to open. In certain instances, the pressurized gas contained by the cartridge 140 may include nitrogen or carbon dioxide. The fire suppression agent within the cylinder 160 may be any suitable fire suppression agent. For example, in certain instances, the fire suppression agent can include sodium bicarbonate, potassium bicarbonate, or monoammonium phosphate. By providing a visual indication of the state of the cartridge 140 (e.g., charged or discharged), inspection as to whether or not the cartridge 140 has been replaced following actuation can be simplified.

Figure 5:
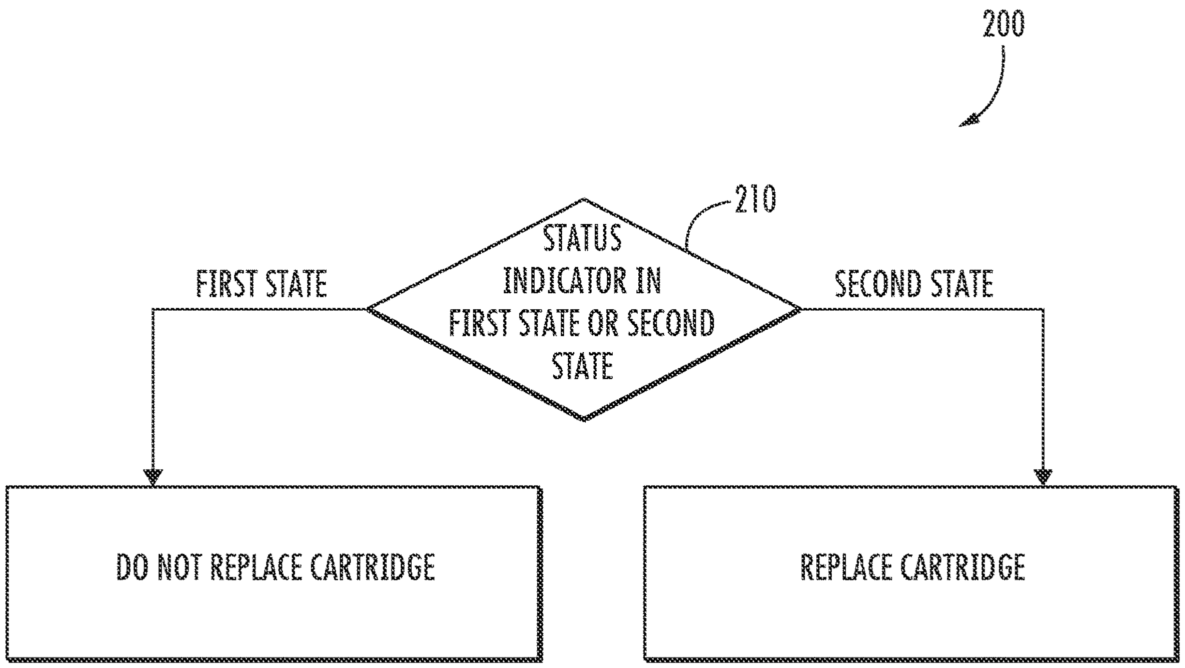
FIG. 5 is a flow diagram illustrating a method of inspecting whether a fire suppression system is capable of being actuated in accordance with one aspect of the disclosure.

The method of inspecting whether a fire suppression system 100 is capable of being actuated is illustrated in FIG. 5. As shown in FIG. 5, the method 200 includes step 210 of determining whether a cartridge 140 within a control box 110 of a fire suppression system 100 contains enough of a pressurized gas to actuate the fire suppression system 100 by inspecting whether a status indicator 120 connected to the body is in a first state or a second state. When the pressurized gas is discharged from the cartridge 140 a physical parameter of the body 142 changes causing the status indicator 120 to change from the first state to the second state. As described above, the physical change may be at least one of a decrease in temperature beyond a threshold, an increase in relative humidity beyond a threshold, and a threshold differential temperature change. The change from the first state to the second state, in certain instances, is irreversible.

A status indicator 120 in the first state indicates that the pressurized gas was not discharged from the cartridge 140. A status indicator 120 in the second state indicates that the pressurized gas was discharged from the cartridge 140. A discharged cartridge 140 will not contain enough pressurized gas to actuate the fire suppression system 100. As such, the status indicator 120, by indicating when the cartridge 140 has been discharged, enables visual indication as to whether or not the cartridge 140 is capable of actuating the fire suppression system 100. As shown in FIG. 5, if the status indicator 120 is in the first state, then the cartridge 140 should be in an un-discharged state and thus should not need to be replaced. However, if the status indicator 120 is in the second state, then discharge has occurred and the cartridge 140 needs to be replaced for the fire suppression system 100 to be capable of actuation.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A cartridge for a pressurized gas triggering device, the cartridge comprising:

a body for holding a pressurized gas, the body defining a breakable seal for releasing the pressurized gas when broken; and a status indicator connected to a surface of the body, the status indicator comprising a first state and a second state, wherein the status indicator undergoes a change from the first state to the second state when exposed to a change in a physical parameter of the surface of the body, the change in the physical parameter indicating a change in a pressure of the pressurized gas the change from the first state to the second state due to the cartridge being discharged, wherein the change in a physical parameter of the body comprises an increase in relative humidity beyond a threshold relative humidity value, the change from the first state to the second state by the status indicator defined by at least a portion of dissolvable crystal dissolving and changing to a color.

2. The cartridge of claim 1, wherein the status indicator is connected to the cartridge with an adhesive.

3. The cartridge of claim 1, wherein the change in a physical parameter of the surface of the body comprises an increase in absolute humidity beyond a threshold absolute humidity value.

4. The cartridge of claim 1, wherein the status indicator comprises at least one thermo-sensitive ink and wherein the change from the first state to the second state by the status indictor is defined by at least a portion of the at least one thermo-sensitive ink changing from a first color to a second color.

5. The cartridge of claim 1, wherein the status indicator comprises a temperature sensor disposed in thermal communication with the surface of the body and in electrical communication with a visual indicator and wherein the change in a physical parameter of the surface of the body comprises a rate of temperature change of the surface of the body.

6. The cartridge of claim 5, wherein the rate of temperature change of the body is calculated using at least one processor, the at least one processor being in electrical communication with the status indicator.

7. The cartridge of claim 1, wherein the change from the first state to the second state is irreversible.

8. A fire suppression system comprising:

a cylinder for holding a fire suppression agent, the cylinder comprising a valve for controlling the release of the fire suppression agent; and a cartridge operatively connected to the valve, the cartridge comprising:

a body for holding a pressurized gas, the body comprising a breakable seal for releasing the pressurized gas when broken; and a status indicator connected to a surface of the body, the status indicator comprising a first state and a second state, wherein the status indicator undergoes a change from the first state to the second state when exposed to a change in a physical parameter of the surface of the body, the change in the physical parameter indicating a change in a pressure of the pressurized gas as a result of the pressurized gas in the cartridge being discharged wherein the change in a physical parameter of the body comprises an increase in relative humidity beyond a threshold relative humidity value, the change from the first state to the second state by the status indicator defined by at least a portion of dissolvable crystal dissolving and changing to a color.

9. The fire suppression system of claim 8, wherein the pressurized gas is discharged using a piercing pin.

10. The fire suppression system of claim 8, wherein the cartridge is configured within a control box, the control box comprising a window configured to allow the status indicator to be visually inspected.

11. The fire suppression system of claim 8, wherein the status indicator is communicatively connected with a visual indicator, the visual indicator signaling when the status indicator changes from the first state to the second state.

12. The fire suppression system of claim 11, wherein the connection between the status indicator and the visual indicator is wireless.

13. The fire suppression system of claim 11, wherein the connection between the status indicator and the visual indicator is wired.

* * * * *